United States Patent
Chen et al.

(10) Patent No.: US 10,784,501 B2
(45) Date of Patent: Sep. 22, 2020

(54) POSITIVE ELECTRODE PLATE AND METHOD OF FORMING SLURRY FOR POSITIVE ELECTRODE PLATE

(71) Applicant: INDUSTRIAL TECHNOLOGY RESEARCH INSTITUTE, Chutung, Hsinchu (TW)

(72) Inventors: Chen-Chung Chen, Taoyuan (TW); Jing-Pin Pan, Chutung Chen (TW); Chang-Rung Yang, Hsinchu (TW); Li-Chun Chen, Keelung (TW); Jen-Chih Lo, Changhua (TW); Guan-Lin Lai, Qionglin Township (TW); Jung-Mu Hsu, Magong (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/208,935

(22) Filed: Dec. 4, 2018

(65) Prior Publication Data
US 2019/0181422 A1 Jun. 13, 2019

(30) Foreign Application Priority Data
Dec. 12, 2017 (TW) .............................. 106143522 A

(51) Int. Cl.
| | | |
|---|---|---|
| H01M 4/131 | (2010.01) | |
| H01M 4/1391 | (2010.01) | |
| H01M 4/485 | (2010.01) | |
| H01M 10/0525 | (2010.01) | |
| H01M 4/62 | (2006.01) | |
| H01M 4/02 | (2006.01) | |

(52) U.S. Cl.
CPC ......... *H01M 4/131* (2013.01); *H01M 4/1391* (2013.01); *H01M 4/485* (2013.01); *H01M 4/622* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,877,385 B2 | 11/2014 | Kamine et al. | |
| 9,054,376 B2 | 6/2015 | Wang et al. | |
| 2012/0153231 A1 | 6/2012 | Wang et al. | |
| 2016/0190580 A1* | 6/2016 | Pan | H01M 4/505 |
| | | | 252/508 |
| 2016/0233512 A1 | 8/2016 | Park et al. | |
| 2017/0309948 A1* | 10/2017 | Azami | H01M 4/13 |

FOREIGN PATENT DOCUMENTS

| | | |
|---|---|---|
| CN | 102544436 A | 7/2012 |
| CN | 102769116 B | 7/2015 |
| CN | 105591092 A | 5/2016 |
| CN | 106785041 A | 5/2017 |
| CN | 105070888 B | 11/2017 |
| EP | 3203560 A1 | 8/2017 |
| JP | 2013-191539 A | 9/2013 |
| JP | 5379832 B2 | 12/2013 |
| JP | 2016-146322 A | 8/2016 |
| JP | 2016-219144 A | 12/2016 |
| JP | 2017-117792 A | 6/2017 |
| TW | 201427143 A | 7/2014 |
| TW | I560930 B | 12/2016 |
| WO | WO 2012/062110 A1 | 5/2012 |
| WO | WO 2016/063813 A1 | 4/2016 |
| WO | WO 2017/004795 A1 | 1/2017 |

OTHER PUBLICATIONS

Taiwanese Office Action and Search Report for Taiwanese Application No. 106143522, dated Dec. 17, 2018.
Elizabeth et al., "Development of $SnO_2$/Multiwalled Carbon Nanotube Paper as Free Standing Anode for Lithium Ion Batteries (LIB)", Electrochimica Acta, 2015, vol. 176, pp. 735-742.
Office Action for TW 106143522 dated May 21, 2018.
Japanese Office Action for Japanese Application No. 2018-230652, dated Nov. 12, 2019, with English translation.

\* cited by examiner

*Primary Examiner* — Haroon S. Sheikh
*Assistant Examiner* — Alex Rae
(74) *Attorney, Agent, or Firm* — Birch, Stewart, Kolasch & Birch, LLP

(57) ABSTRACT

A method of forming slurry for a positive electrode plate is provided, which includes reacting maleimide compound and barbituric acid to form a hyper branched polymer. 0.1 to 1 part by weight of the hyper branched polymer is mixed with 0.01 to 1 part by weight of coupling agent and 0.1 to 6 parts by weight of carbon nanotube to form a mixture. 80 to 97.79 parts by weight of active material is added to the mixture, wherein the hyper branched polymer, the carbon nanotube, and the active material are bonded by the coupling agent.

5 Claims, No Drawings

POSITIVE ELECTRODE PLATE AND METHOD OF FORMING SLURRY FOR POSITIVE ELECTRODE PLATE

CROSS REFERENCE TO RELATED APPLICATIONS

The present application is based on, and claims priority from, Taiwan Application Serial Number 106143522, filed on Dec. 12, 2017, the disclosure of which is hereby incorporated by reference herein in its entirety.

TECHNICAL FIELD

The technical field relates to a positive electrode plate of a lithium battery, and in particular it relates to the slurry of the positive electrode plate and a method of forming the same.

BACKGROUND

Recently, lithium batteries have been widely applied in several types of electronic devices, including cell phones, personal digital assistants, and the like. These lithium battery may be improved by reducing their overall size even further, reducing their weight, and prolonging their lifespan. In addition, lithium batteries may be applied not only in electronic devices, but also in other large devices. This may take the form of the type of removable battery sets that are installed in electronic devices, electric cars, home power servers, and other power storage systems.

Specifically, a lithium battery has a higher power density than that of a lead battery, a nickel-cadmium battery, and other general batteries. According to every theory of charging and discharging, the composition of the positive electrode, the negative electrode, and/or the electrolyte of the battery can be adjusted to enhance the battery's performance. For example, the hyper branched polymer can be introduced into the electrode to efficiently reduce the risk of thermal runaway when a short circuit occurs inside the battery. As such, the safety of the battery can be enhanced. However, the hyper branched polymer is detrimental to the discharge performance of the battery. Even if the conductive powder is further doped, the conductive effect lost by introducing the hyper branched polymer cannot be compensated for.

Accordingly, a novel electrode composition is called for that takes into account both the safety of the battery and the conductivity of the electrode.

SUMMARY

One embodiment of the disclosure provides a positive electrode plate, including: 0.1 to 1 part by weight of the hyper branched polymer; 80 to 97.79 parts by weight of active material; and 0.1 to 6 parts by weight of carbon nanotube, wherein the hyper branched polymer, the carbon nanotube, and the active material are bonded by 0.01 to 1 parts by weight of coupling agent.

One embodiment of the disclosure provides a method of forming slurry for a positive electrode plate, including: reacting maleimide compound and barbituric acid to form a hyper branched polymer; mixing 0.1 to 1 part by weight of the hyper branched polymer, 0.01 to 1 part by weight of coupling agent, and 0.1 to 6 parts by weight of carbon nanotube to form a mixture; and adding 80 to 97.79 parts by weight of active material to the mixture, wherein the hyper branched polymer, the carbon nanotube, and the active material are bonded by the coupling agent.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, a method of forming slurry for a positive electrode plate includes reacting maleimide compound and barbituric acid to form a hyper branched polymer. The maleimide compound can be maleimide, bismaleimide, or a combination thereof. In one embodiment, the maleimide includes N-phenyl maleimide, N-(o-methylphenyl)maleimide, N-(m-methylphenyl)maleimide, N-(p-methylphenyl) maleimide, N-cyclohexylmaleimide, maleimide, maleimidophenol, maleimidephenoxy benzocyclobutene, phosphorous maleimide, phosphate-containing maleimide, silicone-containing maleimide, N-(4-tetrahydropyranyl hydroxyphenyl) maleimide, or 2,6-benzhydryl maleimide. In addition, the barbituric acid (BTA) may serve as an initiator, thereby polymerizing the double bond of the maleimide to form the hyper branched polymer.

The bismaleimide has a chemical structure of

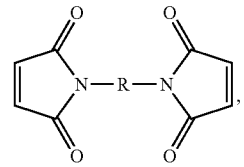

in which R is —(CH$_2$)$_2$—, —(CH$_2$)$_6$—, —(CH$_2$)$_8$—, —(CH$_2$)$_{12}$—,

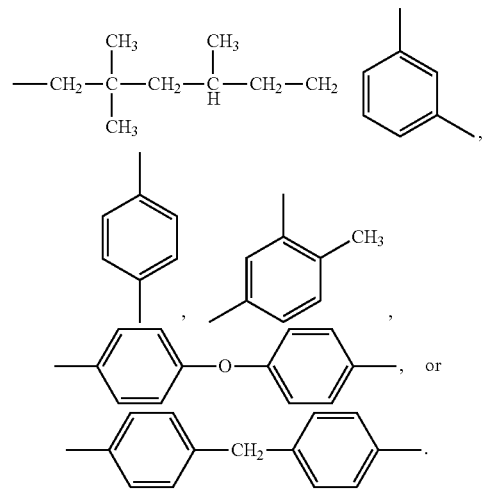

In one embodiment, BTA may serve as an initiator, thereby polymerizing the double bond of the bismaleimide to form the hyper branched polymer. In one embodiment, maleimide and bismaleimide can be mixed in an appropriate ratio, and BTA serves as an initiator to polymerize the mixture to form a hyper branched polymer of the maleimide and the bismaleimide. The maleimide compound and the barbituric acid may have a molar ratio of 97:3 to 60:40. The maleimide compound may self-react if there is not enough barbituric acid, meaning the hyper branched polymer cannot be formed efficiently, negatively affecting the safety of the battery. If there is too much barbituric acid, it cannot completely react with the maleimide compound, and the residual barbituric acid may negatively affect the performance of the battery. The maleimide compound and the barbituric acid can react with each other in a temperature range of between room temperature and 130° C. for a period of 0.5 hours to 48 hours. If the reaction temperature is too low and/or the reaction period is too short, a hyper branched polymer cannot be efficiently formed to provide safety. An operating temperature that is too high and/or a reaction period that is too long may cause the hyper branched polymer to over react and further gel as a 3D network structure, and the network structure cannot be used in the slurry.

In one embodiment, 0.1 to 1 part by weight of the hyper branched polymer, 0.01 to 1 part by weight of coupling agent, and 0.1 to 6 parts by weight of carbon nanotube are mixed to form a mixture. If there is not enough of the coupling agent, the subsequently added active material cannot bond to the hyper branched polymer and the carbon nanotube, thereby lowering the conductivity of the positive electrode plate. If there is too much of the coupling agent, the free coupling agent may over react with the hyper branched polymer, making it difficult to manufacture the positive electrode and negatively affecting the performance of the battery. In one embodiment, the coupling agent is

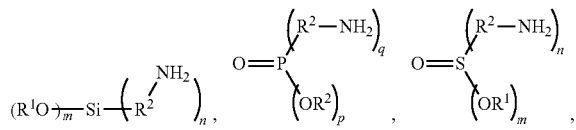

$(CH_2=CH-R^2)_n-Si(OR^1)_m$, or a combination thereof. $R^1$ is H or $C_{1-3}$ alkyl group; $R^2$ is $C_{2-4}$ alkylene group or carbonyl group; m=1-3; n=1-3; m+n=4; p=1-2; q=1-2; and p+q=3. In one embodiment, the coupling agent is allyltrimethoxysilane or (3-aminopropyl)trimethoxysilane. If there is not enough carbon nanotube, a conductive network cannot be formed between the active material and the active material, between the hyper branched polymer and the subsequently added active material, or between the hyper branched polymer and the hyper branched polymer, thereby increasing battery impedance. Too much of the carbon nanotube may depress the content ratio of the subsequently added active material, thereby lowering the capacitance per area of the positive electrode. In one embodiment, the carbon nanotube can be single wall carbon nanotube, a multi-wall carbon nanotube, or a combination thereof. The carbon nanotube may have a length that is between 1 micrometer and tens of micrometers, and a diameter of 0.5 to 3 nm. A carbon nanotube that is too short cannot overcome the distance between particles to form an effective conductive network. A carbon nanotube that is too long may penetrate through the separator film after the assembly of the battery, thereby causing internal short circuits and a high self-discharge rate of the battery. If the diameter of the carbon nanotube is too small, the specific surface area of the carbon nanotube will be too high. For ease of preparing the positive electrode slurry, the carbon nanotube amount should be reduced so that the conductive network is incomplete. In addition, a carbon nanotube that sustains too much stress (during the roller compacting of the electrode) can be easily broken. If the diameter of the carbon nanotube is too large, this may increase the volume of the positive electrode, thereby lowering the compaction density of the electrode.

80 to 97.79 parts by weight of active material is added to the mixture. In one embodiment, the active material includes $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$ (0<y<1), $LiCo_{1-y}Mn_yO_2$ (0<y<1), $LiNi_{1-y}Mn_yO_2$ (0<y<1), $Li(Ni_aCo_b-Mn_c)O_4$ (0<a<2, 0<b<2, 0<c<2, a+b+c=2), $LiMn_{2-z}Ni_zO_4$ (0<z<2) $LiMn_{2-z}Co_zO_4$ (0<z<2), $LiCoPO_4$, $LiFePO_4$, or a combination thereof. In one embodiment, the active material is $LiCoO_2$. The active material is bonded to the hyper branched polymer and the carbon nanotube by the coupling agent, and the hyper branched polymer is bonded to the carbon nanotube by the coupling agent. In other words, the hyper branched polymer, the carbon nanotube, and the active materials have bondings therebetween. The bondings can be silicon-containing segments, phosphorous-containing segments, or sulfur-containing segments, depending on the type of the coupling agent. In one embodiment, the hyper branched polymer, the coupling agent, the carbon nanotube, and the active material can be mixed simultaneously.

In one embodiment, 0.5 to 6 parts by weight of conductive carbon powder can be further added to the mixture. Too much conductive powder may depress the active material content ratio, thereby lowering the capacitance per area of the positive electrode. The conductive carbon powder can be carbon powder with a high specific surface area, such as Super P or KS-6 commercially available from Timcal. In one embodiment, the conductive carbon powder has a diameter of 0.03 μm to 10 μm. Too small the conductive carbon powder has a surface area that is too large, which not only decreases the other material content ratio and leads to a loss of capacitance of the positive electrode, but also may result in an incomplete conductive network, reducing the conductivity of the positive electrode. If the size of conductive carbon powder is too large, the materials of the positive electrode plate cannot stack closely, thereby increasing the porosity of the positive electrode plate and increasing electron transport resistance in the positive electrode plate.

In one embodiment, 1.5 to 6 parts by weight of binder can be further added to the mixture. Too much binder may increase the resistance of the positive electrode plate. In one embodiment, the binder can be polyvinylidene fluoride (PVDF), styrene-butadiene rubber (SBR), polyamide, melamine resin, or a combination thereof.

In one embodiment, a further 25 to 60 parts by weight of solvent can be added to the mixture to adjust the viscosity of the slurry. Too much solvent may result in the slurry being too thin to form a coat. The solvent can be N-methyl-2-pyrrolidone (NMP), ethanol (EtOH), dimethylacetamide (DMAc), γ-butyrolactone (GBL), or a combination thereof.

The slurry is coated on a metal foil, such as copper foil or aluminum foil, dried, and then cut to an appropriate size to serve as a positive electrode plate. A negative electrode plate such as lithium electrode is collocated with the positive electrode plate. An electrolyte (e.g. liquid state, gel state, or solid state) is disposed between the two electrode plates, and then sealed to complete a battery. For details of the negative electrode plate, the electrolyte, and the battery type for being collocated with the positive electrode plate of the disclosure, please refer to U.S. Pat. No. 5,292,601.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Synthesis Example 1 (Hyper Branched Polymer)

2 parts by mole of bismaleimide (BMI) and 1 part by mole of barbituric acid (BTA) were added to N-methyl-2-pyrrolidone (NMP), wherein the total weight of BMI and BTA and the weight of NMP had a ratio of 7:93. The mixture was stirred at room temperature for about 12 hours to obtain a hyper branched polymer.

Synthesis Example 2 (Hyper Branched Polymer and Carbon Nanotube)

The hyper branched polymer was formed by the method of Synthesis Example 1. Single-wall carbon nanotube (SW-CNT, TECO Nanotech Co., Ltd.) was then gradually added to the hyper branched polymer to form a composition of the hyper branched polymer and the carbon nanotube.

Synthesis Example 3 (Hyper Branched Polymer, Carbon Nanotube, and Coupling Agent)

The hyper branched polymer was formed by the method of Synthesis Example 1. SWCNT and coupling agent (allyltrimethoxysilane, commercially available from Sigma Aldrich) were then gradually added to the hyper branched polymer to form a composition of the hyper branched polymer, the carbon nanotube, and the coupling agent. The composition contents of Synthesis Example 1 to 3 are tabulated in Table 1.

TABLE 1

| Composition content | Synthesis Example 1 | Synthesis Example 2 | Synthesis Example 3 |
| --- | --- | --- | --- |
| Hyper branched polymer | Yes | Yes | Yes |
| Carbon nanotube | No | Yes | Yes |
| Coupling agent | No | No | Yes |

Comparative Example 1

93.2 parts by weight of the active material LiCoO$_2$ (R767, solid content=74% to 88%, commercially available from Hunan Ruixiang New Materials Limited Company) was added into a planetary ball mill, and then mixed and dispersed at 25° C. for 60 minutes. Subsequently, 1.05 parts by weight of the conductive carbon powder Super P (Commercially available from Timcal) and 3 parts by weight of the conductive carbon powder KS-6 (Commercially available from Timcal) were added into the planetary ball mill, and then mixed and dispersed at 25° C. for 60 minutes. Subsequently, 2.4 parts by weight of binder PVDF (HSV900, commercially available from Kynar) was added into the planetary ball mill, and then mixed and dispersed at 25° C. for 90 minutes. Subsequently, 35 parts by weight of the solvent NMP was added into the planetary ball mill, and then mixed and dispersed at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Comparative Example 2

0.3 parts by weight of the hyper branched polymer in Synthesis Example 1 was added into a planetary ball mill, and then mixed and dispersed at 25° C. for 10 minutes. Subsequently, 93.2 parts by weight of the active material LiCoO$_2$ (R767) was added into the planetary ball mill, and then mixed and dispersed at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of the binder PVDF was added into the planetary ball mill, and then pulped at 25° C. for 90 minutes. Subsequently, 35 parts by weight of the solvent NMP was added into the planetary ball mill, and then pulped at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Comparative Example 3

0.35 parts by weight of the composition of the hyper branched polymer and the carbon nanotube in Synthesis Example 2 was added into a planetary ball mill, and then mixed and dispersed at 25° C. for 10 minutes. Subsequently, 93.2 parts by weight of the active material LiCoO$_2$ (R767) was added into the planetary ball mill, and then mixed and dispersed at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of the binder PVDF was added into the planetary ball mill, and then pulped at 25° C. for 90 minutes. Subsequently, 35 parts by weight of the solvent NMP was added into the planetary ball mill, and then pulped at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Example 1

0.35 parts by weight of the composition of the hyper branched polymer, the carbon nanotube, and the coupling agent in Synthesis Example 3 was added into a planetary ball mill, and then mixed and dispersed at 25° C. for 10 minutes. Subsequently, 93.2 parts by weight of the active material LiCoO$_2$ (R767) was added into the planetary ball mill, and then mixed and dispersed at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of the binder PVDF was added into the planetary ball mill, and then mixed and dispersed at 25° C. for 90 minutes. Subsequently, 35 parts by weight of the solvent NMP was added into the planetary ball mill, and then mixed and dispersed at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Comparative Example 4

93.2 parts by weight of the active material LiCoO$_2$ (KD-20, commercially available from Umicore) was added into a planetary ball mill, and then mixed and dispersed at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of binder PVDF was added into the planetary ball mill, and then mixed and dispersed at 25° C. for 90 minutes. Subsequently, 35 parts by weight of the solvent NMP was added into the planetary ball mill, and then mixed and dispersed at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Comparative Example 5

0.35 parts by weight of the composition of the hyper branched polymer and the carbon nanotube in Synthesis Example 2 was added into a planetary ball mill, and then mixed and dispersed at 25° C. for 10 minutes. Subsequently, 93.2 parts by weight of the active material LiCoO$_2$ (KD-20) was added into the planetary ball mill, and then pulped at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of the binder PVDF was added into the planetary ball mill, and then pulped at 25° C. for 90 minutes. Subsequently, 35 parts by weight of the solvent NMP was added into the planetary ball mill, and then mixed and dispersed at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$.

Example 2

0.35 parts by weight of the composition of the hyper branched polymer, the carbon nanotube, and the coupling agent in Synthesis Example 3 was added into a planetary ball mill, and then mixed, dispersed, and pulped at 25° C. for 10 minutes. Subsequently, 93.2 parts by weight of the active material LiCoO$_2$ (KD-20) was added into the planetary ball mill, and then mixed and dispersed at 25° C. for 60 minutes. Subsequently, 1.05 parts by weight of the conductive carbon powder Super P and 3 parts by weight of the conductive carbon powder KS-6 were added into the planetary ball mill, and then mixed and dispersed at 25° C. for 60 minutes. Subsequently, 2.4 parts by weight of the binder PVDF was added into the planetary ball mill, and then mixed, dispersed, and pulped at 25° C. for 90 minutes. Subsequently, 35 parts by weight of the solvent NMP was added into the planetary ball mill, and then mixed and dispersed at 25° C. for 20 minutes to obtain slurry. The slurry was coated on a surface of an aluminum foil, and then dried under vacuum and roller compacted to obtain a positive electrode plate. The coating amount of the slurry was 20 mg/cm$^2$. The major contents of Comparative Examples and Examples are listed in Table 2.

TABLE 2

| Composition | Active material R767 | | | | Active material KD-20 | | |
|---|---|---|---|---|---|---|---|
| | Comparative Example 1 | Comparative Example 2 | Comparative Example 3 | Example 1 | Comparative Example 4 | Comparative Example 5 | Example 2 |
| Hyper branched polymer | | V | V | V | | V | V |
| Carbon nanotube | | | V | V | | V | V |
| Coupling agent | | | | V | | | V |
| Active material | V | V | V | V | V | V | V |

The surfaces of the positive electrode plates of Comparative Examples 1 to 5 and Examples 1 to 2 were contacted by four point probes, respectively. The four point probes applied current to the surfaces to measure the voltage changes. The four point probes are arranged in one line, and the two outer probes applied direct current to induce a voltage between the two inner probes, thereby measuring the sheet resistance of the positive electrode plate.

A polyethylene separator (N9620, commercially available from Asahi) was interposed between a lithium negative electrode plate (Commercially available from FMC) and one of the positive electrode plates in Comparative Examples 1 to 5 and Examples 1 and 2. Electrolyte was then added to the layered structure and then sealed to assemble a button battery with a serial No. CR2032. The electrolyte includes solvent of 2 parts by volume of ethylene carbonate (EC), 3 parts by volume of diethyl carbonate (DEC), and 5 parts by volume of propylene carbonate, and lithium salt of LiPF$_6$ (1.1M). The assembled button battery stood for 8 hours, and the battery impedance was measured by 1 kHz alternative current impedance analyzer. The battery formation was processed by 0.1 C/0.1 C charge/discharge to observe the electrical properties and irreversible capacitance of the battery. The battery was charged to 4.45V by 0.2 C current, and then discharged to 3V by different discharge rates (e.g. 0.2 C, 0.5 C, 1 C, and 2 C) to compare the discharge capacitance difference of the battery under different discharge rates.

The battery was charged to 4.45V by a 1 C current, and then disassembled in a dry box to take out the positive electrode plate. The electrode material of the positive electrode plate was scratched out and weighted (10 mg), and then put in a sampling tray of differential scanning calorimeter. The electrode was then heated from 75° C. to 375° C. by a heating rate of 10° C./minute to observe the exothermal behavior of the electrode material during heating.

TABLE 3

| Positive electrode | Active material R767 | | | | Active material KD-20 | | |
|---|---|---|---|---|---|---|---|
| | Comparative Example 1 | Comparative Example 2 | Comparative Example 3 | Example 1 | Comparative Example 4 | Comparative Example 5 | Example 2 |
| Electrode sheet resistance (mΩ) | 0.9 | 1.1 | 0.8 | 0.7 | 0.9 | 0.8 | 0.7 |
| Battery impedance (Ω) | 5.7 | 6.6 | 6.1 | 6.0 | 8.0 | 7.7 | 6.0 |
| $1^{st}$ discharge capacitance (mAh/g) | 168 | 167 | 162 | 175 | 176 | 179 | 177 |
| 1 C discharge (mAh/g) | 142.9 (87%) | 95.9 (58%) | 132.5 (83%) | 148.2 (87%) | 128.0 (77%) | 146.0 (82%) | 161.9 (93%) |
| 2 C discharge (mAh/g) | 67.0 (41%) | 36.2 (22%) | 55.9 (35%) | 79.9 (47%) | 52.6 (32%) | 61.5 (34%) | 108.6 (62%) |
| Exothermal amount (J/g) | 1022.3 | 852.7 | 832.0 | 813.3 | 1002.3 | 749.5 | 751.6 |

As shown in Table 3, the positive electrode plates formed of a composition simultaneously containing the hyper branched polymer, the carbon nanotube, and the coupling agent had better electrical properties after being assembled to batteries.

Comparative Example 6

0.79 g of the hyper branched polymer in Synthesis Example 1 was added to 67.1 g of the active material lithium nickel cobalt alumina (LNCA, commercially available from BASF/TODA) and then mixed for 30 minutes. 0.26 g of SWCNT was then added to the mixture and then mixed for 30 minutes. 14 g of NMP was added to the mixture, and the mixture was heated to 70° C. and mixed at 70° C. for 1 hour to form slurry. The slurry was put into a vacuum oven and dried at 200° C. under vacuum for 12 hours to form powder. The powder was put into a mold and compacted by different pressures in different batches to form round cakes with a diameter of 1 cm. Current and voltage were applied from the top of the round cake to the bottom of the round cakes for measuring the impedance of round cakes compacted by different pressures. The volume resistivities of the round cakes were calculated by the impedance, the cross-sectional area, and the thickness of the round cakes, as tabulated in Table 4.

Comparative Example 7

0.02 g of coupling agent was added to 67.1 g of the active material LNCA, and then mixed for 30 minutes. 0.79 g of the hyper branched polymer in Synthesis Example 1 was added to the mixture and then mixed for 30 minutes. 0.26 g of SWCNT was then added to the mixture and then mixed for 30 minutes. 14 g of NMP was added to the mixture, and the mixture was heated to 70° C. and mixed at 70° C. for 1 hour to form slurry. The slurry was put into a vacuum oven and dried at 200° C. under vacuum for 12 hours to form powder. The powder was put into a mold and compacted by different pressures in different batches to form round cakes with a diameter of 1 cm. Current and voltage were applied from the top of the round cake to the bottom of the round cakes for measuring the impedance of round cakes compacted by different pressures. The volume resistivities of the round cakes were calculated by the impedance, the cross-sectional area, and the thickness of the round cakes, as tabulated in Table 4.

Example 3

0.79 g of the composition of the hyper branched polymer, SWCNT, and the coupling agent in Synthesis Example 3, 67.1 g of the active material LNCA, and 14 g of NMP were mixed, and the mixture was heated to 70° C. and mixed at 70° C. for 1 hour to form slurry. The slurry was put into a vacuum oven and dried at 200° C. under vacuum for 12 hours to form powder. The powder was put into a mold and compacted by different pressures in different batches to form round cakes with a diameter of 1 cm. Current and voltage were applied from the top of the round cake to the bottom of the round cakes for measuring the impedance of round cakes compacted by different pressures. The volume resistivities of the round cakes were calculated by the impedance, the cross-sectional area, and the thickness of the round cakes, as tabulated in Table 4.

TABLE 4

| | Volume resistivity after being compacted by 10 kgf (Compaction ratio was 10% to 12%) | Volume resistivity after being compacted by 20 kgf (Compaction ratio was 13% to 15%) | Volume resistivity after being compacted by 30 kgf (Compaction ratio was 16% to 18%) | Note |
|---|---|---|---|---|
| Comparative Example 6 | 12893 ± 2238 | 2612 ± 608 | 1131 ± 208 | The hyper branched polymer was mixed with active material, and then mixed with carbon nanotube (without coupling agent). |
| Comparative Example 7 | 7321 ± 803 | 1804 ± 164 | 827 ± 89 | The coupling agent was mixed with the active material, and then mixed with the hyper branched polymer and the carbon nanotube. |

TABLE 4-continued

| | Volume resistivity after being compacted by 10 kgf (Compaction ratio was 10% to 12%) | Volume resistivity after being compacted by 20 kgf (Compaction ratio was 13% to 15%) | Volume resistivity after being compacted by 30 kgf (Compaction ratio was 16% to 18%) | Note |
|---|---|---|---|---|
| Example 3 | 876 ± 23 | 432 ± 15 | 295 ± 1 | The hyper-branched polymer, the carbon nanotube, and the coupling agent were mixed to form a composition, and then mixed with the active material. |

As shown in Table 4, the volume resistivity could be reduced by mixing the coupling agent and the active material, and then mixing with the hyper branched polymer and the carbon nanotube; or mixing the hyper branched polymer, the carbon nanotube, and the coupling agent, and then mixing with the active material. However, the lowest volume resistivity was achieved by mixing the hyper branched polymer, the carbon nanotube, and the coupling agent, and then mixing with the active material.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of forming slurry for a positive electrode plate, comprising:
   reacting maleimide compound and barbituric acid to form a hyper branched polymer;
   mixing 0.1 to 1 part by weight of the hyper branched polymer, 0.01 to 1 part by weight of coupling agent, and 0.1 to 6 parts by weight of carbon nanotube to form a mixture; and
   adding 80 to 97.79 parts by weight of active material to the mixture,
   wherein the hyper branched polymer, the carbon nanotube, and the active material are bonded by the coupling agent.

2. The method as claimed in claim 1, wherein the active material comprises $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$ (0<y<1), $LiCo_{1-y}Mn_yO_2$ (0<y<1), $LiNi_{1-y}Mn_yO_2$ (0<y<1), $Li(Ni_aCo_bMn_c)O_4$ (0<a<2, 0<b<2, 0<c<2, a+b+c=2), $LiMn_{2-z}Ni_zO_4$ (0<z<2), $LiMn_{2-z}Co_zO_4$ (0<z<2), $LiCoPO_4$, $LiFePO_4$, or a combination thereof.

3. The method as claimed in claim 1, wherein the coupling agent has a chemical structure of:

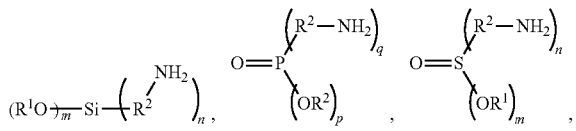

$(CH_2=CH-R^2)_n-Si(OR^1)_m$, or a combination thereof,
   wherein $R^1$ is H or $C_{1-3}$ alkyl group;
   $R^2$ is $C_{2-4}$ alkylene group or carbonyl group;
   m=1-3;
   n=1-3;
   m+n=4;
   p=1-2;
   q=1-2; and
   p+q=3.

4. The method as claimed in claim 1, further comprising adding 0.5 to 6 parts by weight of conductive carbon powder to the mixture.

5. The method as claimed in claim 1, further comprising adding 1.5 to 6 parts by weight of adhesive to the mixture.

* * * * *